May 19, 1925.  
A. J. DETLAFF  
CLUTCH  
Filed June 17, 1922   3 Sheets-Sheet 1

1,538,029

Inventor  
Anthony J. Detlaff.  
By  
Attorneys

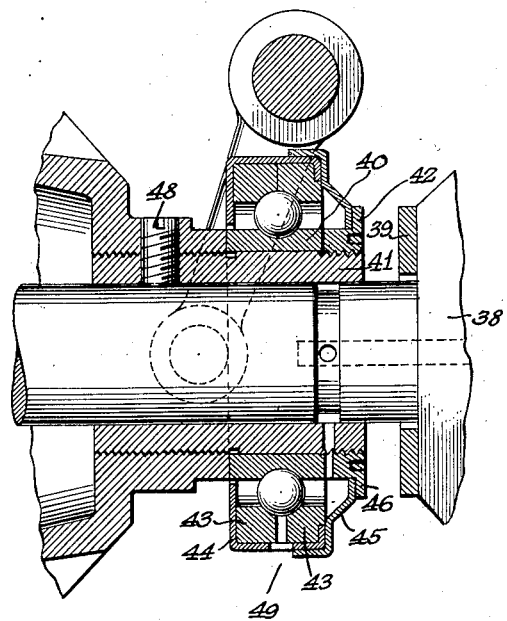
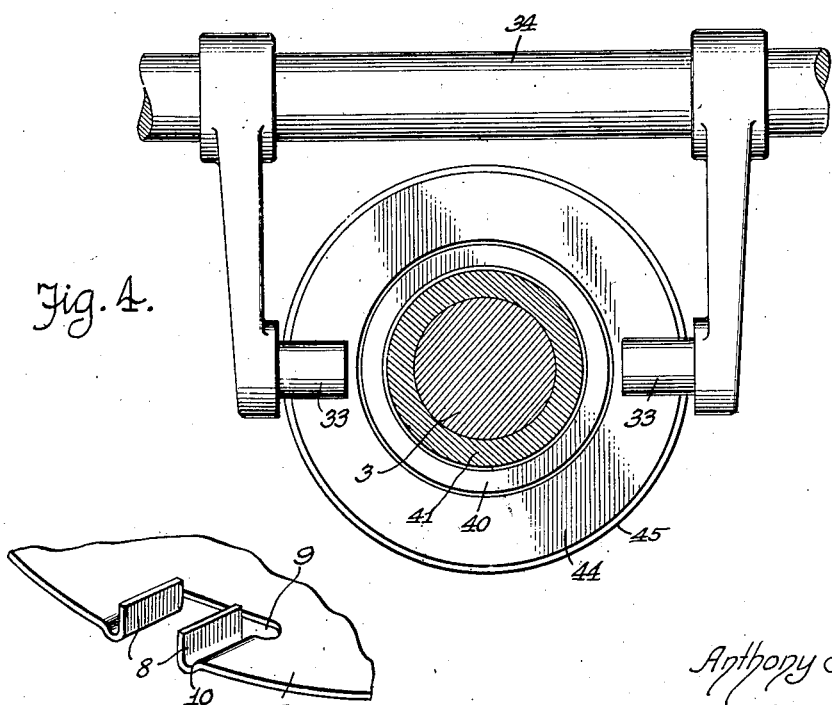
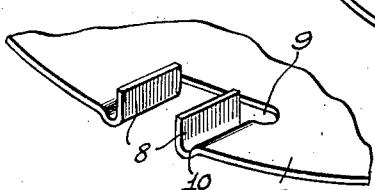

Patented May 19, 1925.

1,538,029

UNITED STATES PATENT OFFICE.

ANTHONY J. DETLAFF, OF DETROIT, MICHIGAN.

CLUTCH.

Application filed June 17, 1922. Serial No. 568,988.

*To all whom it may concern:*

Be it known that I, ANTHONY J. DETLAFF, a citizen of the United States of America, residing at Detroit, in the county of Wayne and State of Michigan, have invented certain new and useful Improvements in Clutches, of which the following is a specification, reference being had therein to the accompanying drawings.

This invention relates to clutch mechanism, more particularly to clutches used for the transmission of power from an engine for use on automobiles or selfpropelled vehicles of any character.

A primary object of the invention is to prevent the rattling which is likely to occur in clutches in which a plurality of clutch disks are used.

A further object of the invention is to provide a more efficient means for withdrawing the clutch disks from contact with each other.

Other objects will appear in connection with the description of a preferred embodiment of the invention illustrated in the accompanying drawings wherein—

Fig. 3 is a longitudinal section showing a modified form of the release bearing retainer;

Fig. 4 is an elevation of the release bearing retainer and the release yoke shown in Fig. 3, and Fig. 5 is a perspective view of a fragment of one edge of a clutch disk.

Figure 1:
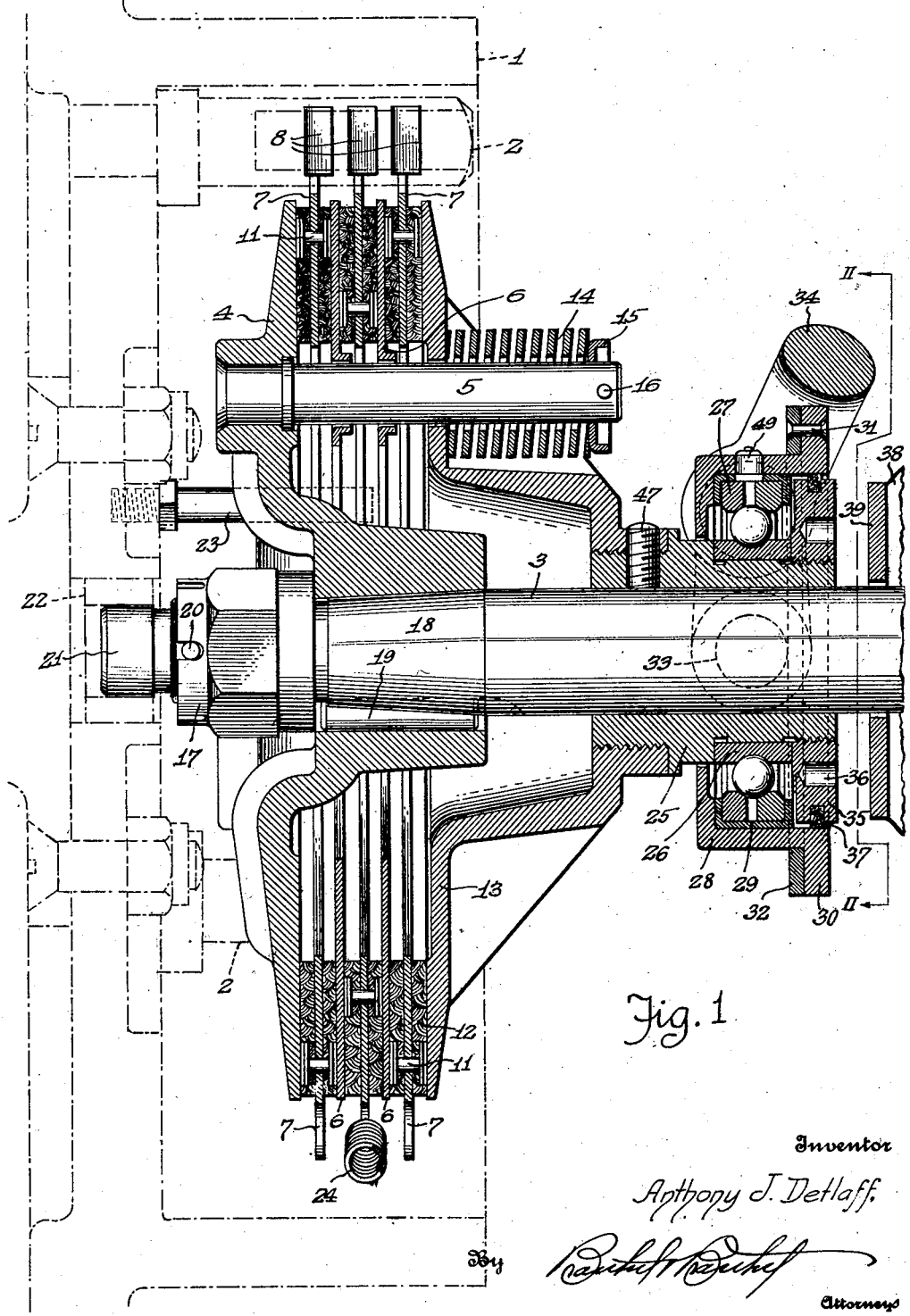
Figure 1 is a central longitudinal section.
Figure 2:
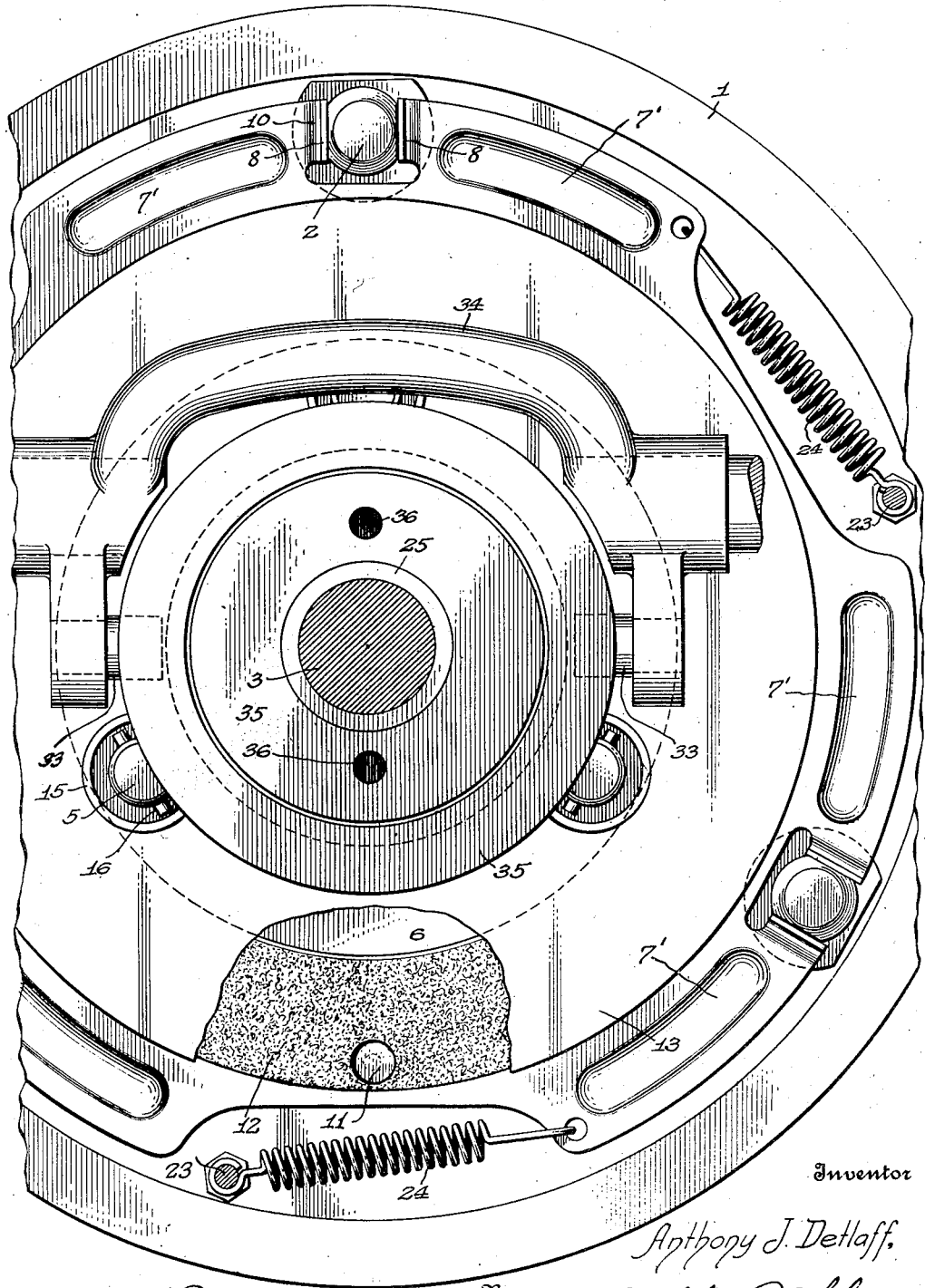
Fig. 2 is an end elevation taken on the line II—II of Fig. 1.

The flywheel of the engine is indicated at 1 in dot and dash lines in Fig. 1, and in solid lines in Fig. 2, as having a hollow cylindrical end portion within which is mounted a plurality of studs 2. Mounted co-axially with the flywheel 1 is a clutch shaft 3 having secured thereto an end plate 4 carrying a plurality of studs 5. Mounted upon the studs 5 are a plurality of disks 6 having perforations therein to engage the studs 5 to hold the plates substantially co-axial with the shaft 3. Alternating with the disks 6 are a plurality of disks 7 having their periphery formed with projecting ears 8 at intervals to engage on opposite sides of the studs 2. These ears 8 are formed by punching out a portion 9 from the disk and slitting the metal between the cut-out portion and the periphery of the disk. The free ends of the slit portion are then bent first to one side of the disk as indicated at 10 and then rebent to extend substantially at right angles to the plane of the disk 7, the ears being intersected by the plane of the disk 7. The purpose of giving the metal this double curvature adjacent to the ear is to provide greater resiliency and to prevent breaking of the metal at the line of flexure. It has been found that when the ear has been bent to one side only at substantially right angles to the plane of the disk, continued flexure of the metal due to pressure of the ear against the stud with which it lies in contact is likely to cause the metal to break at its line of flexure. The double curvature provides a less abrupt bend and distributes the strain over a much wider area. Ribs 7' provide greater rigidity.

Secured upon the disks 7 as by rivets 11 are friction facings 12 which may be of asbestos or other suitable material. A pressure plate 13 is normally held in contact with the end member of the series of disks remote from the end plate 4 by means of coiled springs 14 surrounding the studs 5 and held thereon by means of securing disks 15 held upon the studs 5 by pins 16. The end plate 4 is secured upon the shaft 3 by means of a nut 17, the hub of the plate and the shaft being mutually tapered as shown at 18. A key 19 is provided to prevent relative rotation of the end plate 4 upon the shaft 3 and a pin 20 is used to prevent rotation of the nut 17. The end 21 of the shaft 3 adjacent to the flywheel 1 is adapted to fit within a bearing 22 co-axial with the flywheel.

Arranged around the flywheel 1 are a plurality of studs 23 and upon each stud is mounted a spring 24, the opposite end ot each spring engaging one of the plates 7. Each of the plates 7 has its periphery provided with recesses into which the springs extend and hold the ears 8 in contact with the studs 2.

The pressure plate 13 is secured to a sleeve 25 mounted upon the shaft 3. Upon the sleeve 25 is secured the inner member 26 of the release bearing, the outer portion 27 of the bearing being held within the release bearing retainer 28. For assembly purposes the outer bearing member 27 may be made in two sections held together by a channeled member 29. The member 28 may conveniently be made of a casting having a projecting flange 30 to which is secured as by rivets 31 a steel bearing ring 32 engaged by the studs 33 of the release yoke 34. As a means for retaining the member 26 upon the sleeve 25 a lock nut 35 may be used, the nut having recesses 36 for a wrench and the outer periphery of the nut 35 being provided with a packing 37 of felt or other suitable material to prevent dirt from entering the bearing.

The release bearing retainer ordinarily lies closely adjacent to the transmission casing 38 which is shown as provided with an end facing 39 against which the end of the sleeve 25 and of the nut 35 are adapted to engage when the release bearing is forced toward the member 39 as the clutch is released. This contact of the sleeve and nut with the member 39 acts as a friction brake to stop the rotation of the shaft 3 with the member secured thereto.

A modified form of release bearing is shown in Fig. 3, in which the inner bearing member 40 is held upon the sleeve 41 by means of a nut 42. The outer bearing members 43 are secured together by a metal channel member 44 which on the side next to the pressure plate 13 extends close to the bearing member 40. The outer side of the bearing is covered by a cup-shaped cap 45, the inner portion of which is engaged by a flange 46 upon the nut 42. The sleeve 25 may be secured to the pressure plate 13 by means of the screw 47 and the sleeve 41 may be secured to the pressure plate 13 in the modification by means of the screw 48, the purpose of the screw in either case being to prevent relative movement of the sleeve and the pressure plate such as might occur due to the friction between either sleeve and the bearing plate 39. The bearings may be provided with oil cups 49 of any suitable design.

It will be seen that there is thus provided a device possessing the particular features of advantage enumerated as desirable but which obviously is susceptible of modification in form, proportion and details of construction without departure from the principle involved or sacrificing any of its advantages. The invention is therefore not limited to the specific details shown but is claimed in any of its forms or modifications within the legitimate and valid scope of the appended claims.

I claim:

1. In a clutch wherein a series of disks have peripheral portions engaging studs on a member, said disks having peripheral portions provided with recesses, and coiled springs maintaining contact between said disks and studs, said springs being disposed at intervals about said disks and in the recesses of said disks, and connecting said disks to said member.

2. In a clutch, the combination of a series of disks, clamping plates at the ends of the series, studs on one of said plates engaging alternate disks, a member, disk engaging means carried by said member to engage the other disks of the series, and springs between said disk engaging means connected with said member and with the last mentioned series of said disks to hold them in contact with said disk engaging means.

3. In a clutch, the combination with a fly wheel, friction disks in said fly wheel, and studs in said fly wheel with which said disks engage, of coiled springs connected with said disks and with said fly wheel, said springs adapted to exert a substantially tangential pull to hold said disks yieldingly in engagement with said studs.

4. In a clutch, a disk having a perforation formed therein, the portion of the disk between the perforation and the edge of the disk being severed to provide two sections, said sections being bent away from the plane of the disk and then rebent to form two substantially parallel bearing surfaces adapted to receive an abutment member therebetween preventing rotation of the disk in its own plane.

5. In a clutch, a disk having a perforation formed therein, the portion of the disk between the perforation and the edge of the disk being severed to provide two sections, said sections being bent to form substantially parallel bearing surfaces adapted to receive an abutment member therebetween, and ribs formed upon the disk adjacent to said bearing surfaces to provide increased rigidity.

In testimony whereof I affix my signature in presence of two witnesses.

ANTHONY J. DETLAFF.

Witnesses:
ARTHUR MINNICK,
D. M. MACDUFF.